(12) United States Patent
Steelhammer et al.

(10) Patent No.: US 7,491,377 B2
(45) Date of Patent: Feb. 17, 2009

(54) METHOD OF MAKING BASIC ALUMINUM HALIDES

(75) Inventors: Joe C. Steelhammer, West Point, MS (US); Hollie Copeland, Philadelphia, MS (US)

(73) Assignee: Southern Ionics Incorporated, West Point, MS (US)

( * ) Notice: Subject to any disclaimer, the term of this patent is extended or adjusted under 35 U.S.C. 154(b) by 269 days.

(21) Appl. No.: 11/657,850

(22) Filed: Jan. 25, 2007

(65) Prior Publication Data
US 2008/0181840 A1    Jul. 31, 2008

(51) Int. Cl.
*C01F 7/56* (2006.01)
*C01F 7/68* (2006.01)

(52) U.S. Cl. .................. 423/462; 423/467; 423/466; 423/556; 423/327.1

(58) Field of Classification Search ............. 423/327.1, 423/556, 462, 466, 467
See application file for complete search history.

(56) References Cited

U.S. PATENT DOCUMENTS

| | | | |
|---|---|---|---|
| 2,196,016 A | 4/1940 | Huehn et al. | |
| 3,020,242 A | 2/1962 | McCartney et al. | |
| 3,340,205 A | 9/1967 | Hayes et al. | |
| 3,476,509 A | 11/1969 | Jones | |
| 3,535,268 A | 10/1970 | Hayes | |
| 3,891,745 A | 6/1975 | Bellan et al. | |
| 4,944,933 A * | 7/1990 | Inward | 423/462 |
| 5,358,694 A * | 10/1994 | Giovanniello | 423/462 |
| 5,718,876 A * | 2/1998 | Parekh et al. | 423/462 |

\* cited by examiner

*Primary Examiner*—Ngoc-Yen M Nguyen
(74) *Attorney, Agent, or Firm*—Kilyk & Bowersox, P.L.L.C.

(57) ABSTRACT

Methods of making basic aluminum halides, such as basic aluminum chlorides, are described, which includes the use of catalysts, such as nickel cations or cobalt cations.

23 Claims, 3 Drawing Sheets

Comparision of reaction rate for different metal salts. Metal salts added as their chlorides, Concentrations of metal is based on the weight of 28% $AlCl_3$ used.

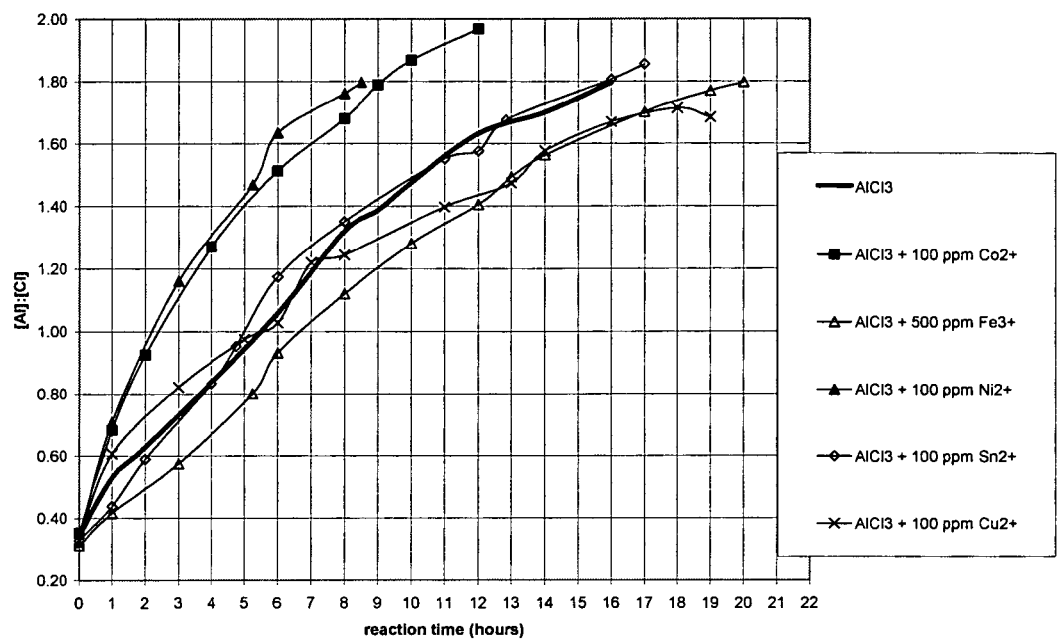
Figure 1. Comparision of reaction rate for different metal salts. Metal salts added as their chlorides, Concentrations of metal is based on the weight of 28% $AlCl_3$ used.

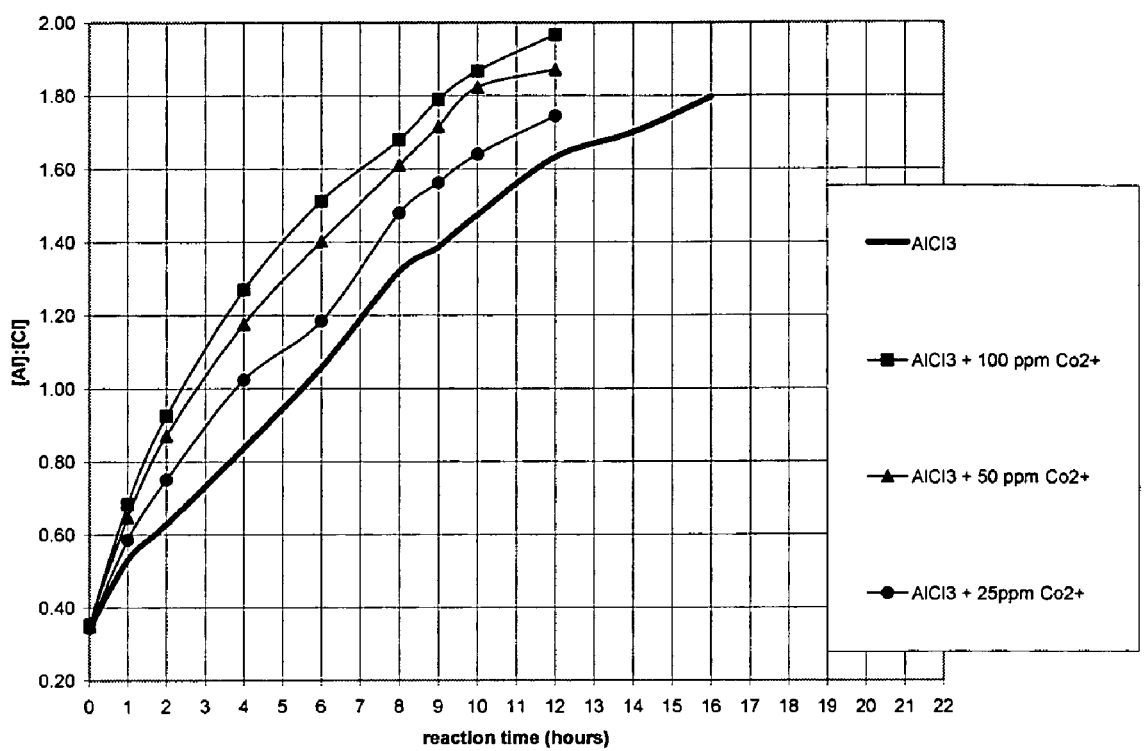
Figure 2. Effect of different cobalt concentrations of reaction rate.

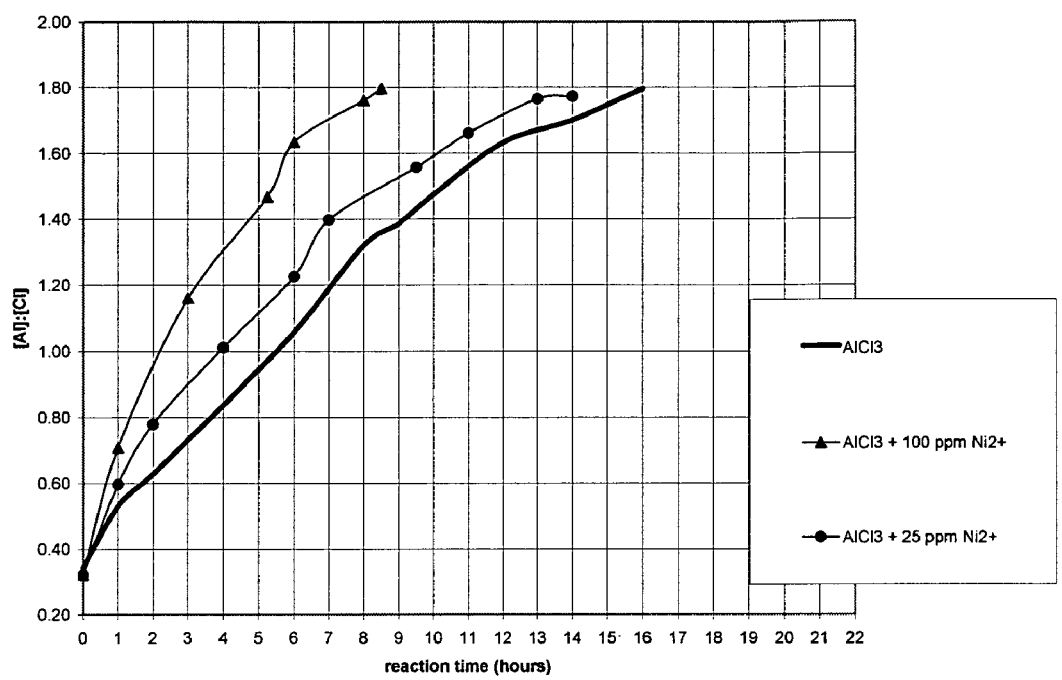
Figure 3. Effect of different nickel concentrations on reaction rate.

METHOD OF MAKING BASIC ALUMINUM HALIDES

BACKGROUND OF THE INVENTION

The present invention relates to methods to make basic aluminum halides, such as basic aluminum chlorides. The present invention further relates to basic aluminum halides, such as basic aluminum chlorides made by the one or more processes of the present invention.

Basic aluminum chlorides are useful in the manufacture of active ingredients for antiperspirants, as coagulants in water treatment, and in the manufacture of alumina catalysts and supports, as well as other uses. Basic aluminum chloride is known by other names, such as aluminum chloride hydroxide, aluminum hydroxychloride, aluminum chlorhydroxide, polyaluminum chloride, aluminum oxychloride, aluminum chlorohydrate, and aluminum chlorhydrate. The exact nomenclature varies with the industries using the products. For example, the antiperspirant industry tends to call these materials basic aluminum chlorides or aluminum chlorohydrates, whereas the water treatment industry typically refers to them as polyaluminum chlorides, and the catalyst industry typically refers to them as aluminum chlorohydrates or aluminum sols. In U.S. Pat. No. 3,476,509, incorporated in its entirety by reference herein, a process is described to make water-soluble basic aluminum halide compounds, which includes the use of a water-soluble thallium compound for catalytic purposes. However, the use of a thallium salt is just not a viable approach today due to the fact that thallium salts are on the List of Extremely Hazardous Substances mandated by §302 of the Emergency Planning and Community Right-to-Know Act of 1986 (SARA Title III EPCRA Extremely Hazardous Substances).

Accordingly, it would be useful to find alternative mechanisms to make basic aluminum halide compounds, especially basic aluminum chlorides, which have the advantages achieved with a thallium catalyst, but without the use of an extremely hazardous substance.

SUMMARY OF THE PRESENT INVENTION

A feature of the present invention to provide processes for making basic aluminum halides, such as basic aluminum chlorides.

A further feature of the present invention is to provide processes to make basic aluminum halides, which avoid the use of thallium salt as a catalyst.

A further feature of the present invention is to provide processes of making basic aluminum halides which have reduced reaction times to completion.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method to make basic aluminum halide. The method includes reacting metallic aluminum with at least one aluminum halide or acid thereof in the presence of water and a catalytic amount of at least one catalyst, wherein the catalyst is or includes a nickel cation, cobalt cation, or both. The nickel cation or cobalt cation can be introduced as salts or can be present as a salt or other acid soluble compound in the reaction.

The present invention further relates to a method to make basic aluminum chloride which includes reacting a metallic aluminum with an aluminum chloride or hydrochloric acid in the presence of water and a catalytic amount of at least one catalyst, wherein the catalyst is a nickel cation, cobalt cation, or both. Again, the catalyst can be in the form of a salt or other acid soluble compound.

The present invention also relates to products made by one or more methods of the present application.

It is to be understood that both the foregoing general description and the following detailed description are exemplary and explanatory only and are intended to provide a further explanation of the present invention, as claimed.

The accompanying drawings, which are incorporated in and constitute a part of this application, illustrate one or more embodiments of the present invention and together with the description, serve to explain the principles of the present invention.

BRIEF DESCRIPTION OF DRAWINGS

FIG. 1 is a graph showing a comparison of reaction rates for different metal salts, wherein the metal salts are added as their chlorides. The concentration of metal is based on the weight of 28% $AlCl_3$ used.

FIG. 2 is a graph showing the effect of different cobalt concentrations on reaction rates.

FIG. 3 is a graph showing the effective different nickel concentrations on reaction rates.

DETAILED DESCRIPTION OF THE PRESENT INVENTION

The present invention relates to methods of making basic aluminum halide compounds, such as basic aluminum chlorides.

The present invention further relates to products made by one or more processes of the present invention.

In more detail, in one or more embodiments of the present invention, the present invention relates to a method of making basic aluminum halide compounds, wherein the method involves reacting metallic aluminum with at least one aluminum halide or acid thereof in the presence of water and a catalytic amount of at least one catalyst, wherein the catalyst is or includes a nickel cation, cobalt cation, or both.

The metallic aluminum can be in any shape or form and have any purity. For example, the metallic aluminum can have an ingot form or be in the form of a powder, flake, chips, sheet, or any other form. The metallic aluminum can be in the form of shavings, granules, or the like. The metallic aluminum can have any bulk density or other physical and morphological characteristics. For instance, the bulk density can be from 0.2 to 2.0 kg/liter or other bulk densities above or below this range. The metallic aluminum can have any purity, such as, but not limited to, a purity of 90% Al to 99.9999% Al or higher. The purity can be from 95% Al to 99.999% Al or from 99% Al to 99.999% Al, or 99.5% Al to 99.999% Al, or 99.99% Al to 99.999% or higher, wherein said percents refer to the percent weight Al present in the metallic aluminum. The amount of the metallic aluminum used in the process of the invention can vary based on the amount theoretically required for the formation of the desired basic aluminum halide compound. Generally, some leeway is provided. For instance, the amount of metallic aluminum can vary from the theoretically required amount on the order of 1 to 10 times the amount theoretically required for the formation of the particular basic aluminum halide compound desired. As one example, if aluminum chloride $Al_2(OH)_5Cl$ is desired, aluminum chloride reacts with metallic aluminum in the ratio of 1 mol of $AlCl_3$ for every 5 mols of aluminum to form $Al_2(OH)_5Cl$. The theoretical amount of aluminum metal required is determined from the reaction equation $10Al(s)+2AlCl_3(aq)+30H_2O \rightarrow 6Al_2(OH)_5Cl(aq)+15H_2(g)\uparrow$. Thus, the amount of metallic aluminum used can vary from 1 to 10 times the theoretical amount and, therefore, the amount of aluminum that can be used can be from 5 to 50 times the amount of $AlCl_3$ used. For the formation of other basic aluminum chlorides, the theoretical amount of aluminum metal required would be given appropriately by modifying the reaction equation above. For example, to make the basic aluminum chloride $Al_2(OH)_4Cl_2$, the theoretical amount of aluminum metal required would be 1 mol $AlCl_3$ for every 2 mol aluminum metal, as given by the equation $8Al(s)+4AlCl_3(aq)+24H_2O \rightarrow 6Al_2(OH)_4Cl_2(aq)+12H_2(g)\uparrow$.

With respect to the aluminum halide, the aluminum halide can be an aluminum halide salt or acid thereof, such as aluminum fluoride, aluminum chloride, aluminum bromide, and/or aluminum iodide, or hydrogen fluoride, hydrogen chloride, hydrogen bromide, or hydrogen iodide. The concentration of the aluminum halide or acid thereof can be any range, such as in a range from 10.0 to 30.0 wt %. Other concentrations can be used below or above these ranges.

In addition to the metallic aluminum and aluminum chloride noted above, sufficient water is present to not only form the desired basic aluminum chloride, as denoted in the above reaction equations, but to maintain a stable aqueous solution of the basic aluminum chloride. Generally, the total amount of water present is an amount that makes the effective $AlCl_3$ concentration in the reactor between 8 and 20% by weight $AlCl_3$. Additional water can be added at the beginning of the reaction, or added appropriately during the reaction to maintain a stable reaction mixture relative to the solubility of the basic aluminum chloride. Once a stable aqueous solution of the basic aluminum chloride is made, a dry product of the basic aluminum halide can be achieved by evaporation or spray drying of the solution once the reaction is complete. Other concentrating techniques can also be used. However, most applications of basic aluminum chlorides utilize them as aqueous solutions.

As indicated above, in combination or in the alternative, instead of an aluminum halide salt, acid forms of the halide can be used, such as hydrochloric acid. One such process is described in U.S. Pat. No. 3,891,745, incorporated in its entirety by reference herein, wherein a hydrochloric acid solution is used. When hydrochloric acid and/or other acid is used, this reaction can be the dissolution or corrosion of the aluminum metal in an acidic solution, which generally converts to an aluminum halide solution, such as an aluminum chloride solution, as an intermediate reaction, according to the reaction equation $2Al(s)+6HCl(aq) \rightarrow 2AlCl_3(aq)+3H_2(g)\uparrow$. The concentration of acid, such as hydrochloric acid, is such that the concentration of the $AlCl_3$ solution produced in this intermediate step is equal to that required for the subsequent $AlCl_3$—Al metal reaction step. The concentration of hydrochloric acid can be a 5 to 37.5% by weight acid solution. Other concentrations of acid can be used.

With respect to the catalyst, the catalyst can be a nickel or cobalt cation. The nickel or cobalt cation can be any valent state. For instance, the nickel can be a $Ni^{2+}$, $Ni^{3+}$, and the like. Also, the cobalt can be any valent state, such as $Co^{2+}$, $Co^{3+}$, and the like. The catalyst, while generally present as a cation in the reaction, can be introduced or present as a nickel compound, such as a nickel salt, or a cobalt compound, such as a cobalt salt, or both. For instance, the nickel salt can be a nickel acetate, nickel carbonate, nickel nitrate, nickel sulfate, nickel chloride, nickel oxide, and the like. Similarly, the cobalt can be a cobalt acetate, cobalt carbonate, cobalt nitrate, cobalt sulfate, cobalt chloride, cobalt oxide, and the like. The catalyst is present in a catalytic amount to increase the reaction rate of the formation of the basic aluminum halide. The increase can be determined from the standpoint of comparing the same reaction occurring without any nickel or cobalt present compared to nickel or cobalt cations being present, and a faster reaction time being achieved, with all other ingredients the same. The catalytic amount of Ni or Co ion, based on the weight of anhydrous aluminum halide (e.g., aluminum chloride) used in the reaction, can be any amount, such as from about 10 ppm to 1,000 ppm, for instance, from 20 ppm to 500 ppm. Other amounts above or below these ranges can be used, such as 50 ppm to 900 ppm, 75 ppm to 800 ppm, 100 ppm to 600 ppm, 150 ppm to 500 ppm, and the like.

As an option, other components can be present in this reaction, such as one or more additional anions introduced in other forms, such as sulfate or silicate or other anions. These anions can be introduced as salts of aluminum, sodium, potassium or other metals. Generally, the amount of these components is 10% by weight or less based on the weight of the basic aluminum chloride on an anhydrous basis. The amount can be from about 0.1% by weight to about 10% by weight or from about 3% by weight to about 7% by weight, or 5% by weight to 7% by weight.

Other components or ingredients can be present in this amount such as, but not limited to, polymeric dispersants, corrosion inhibitors, polymeric coagulants, and/or surfactants and the like. Generally, the amount of these components is 30% by weight or less based on the weight of the basic aluminum chloride on an anhydrous basis.

The order of mixing the components used in the methods of the present invention is not critical and any order can be used. The components can be added sequentially, all at the same time, or various components can be pre-combined prior to being introduced into the reactor. The metallic aluminum can optionally be added last to the solution as a means for controlling the degree of reaction. However, any order of addition or combination can be used in the processes of the present invention.

The methods of the present invention can be conducted in any reaction vessel commonly used for the formation of chemicals, such as basic aluminum halides. The temperature at which the reaction occurs can be any temperature above the freezing point of the reaction mixture and typically at or slightly below the boiling point of the reaction mixture of the ingredients. The reaction can occur at a temperature in the range of from 35° C. to 110° C., such as from 50° C. to 100° C. or from 70° C. to 100° C. The pH of the overall reaction mixture can be any pH, such as from about 2 to about 5.0, for example, from 2.5 to 4.5. Typically, the reaction time will depend on the amount of ingredients as well as the amount of catalysts used. The reaction time can be on the order of 10 minutes to 12 hours or more, again, depending on the particular basic aluminum halide being formed and the amount of ingredients present as well as the size of the reaction vessel.

The basic aluminum halide formed can be a water-soluble basic aluminum halide. The basic aluminum halide can have the formula:

$$Al_2(OH)_nX_{6-n}$$

wherein n is from 1 to 5 (e.g., integers of 1, 2, 3, 4, or 5 or fractions thereof) and X is fluorine, chlorine, bromine, or iodine. The basic aluminum halides prepared by the processes of the present invention can be used in the same products and manner as conventional basic aluminum halides produced by other processes. The reaction vessels, the reaction conditions, and other process options that are described in U.S. Pat. Nos. 3,476,509; 3,891,745; 2,196,016; 3,340,205; 3,535,268; and 3,020,242 can be used herein and these patents are incorporated in their entirety by reference herein.

The present invention will be further clarified by the following examples, which are intended to be exemplary of the present invention.

EXAMPLE 1

The examples used the following experimental protocol and conditions. To a 1 liter reaction vessel equipped with a condenser, 210.7 g of a 28% $AlCl_3$ solution (5.3% Al; 22.3% Cl) and 283.5 g of deionized water was added. To this was added a dilute solution (approximately 2 wt % as the metal) of a chloride salt of cobalt(2+), nickel(+1), iron(+3), copper(+2) or tin(+2) (or none in the case of the control). The concentration of metal salt used is expressed in terms of the metal basis the weight of 28% $AlCl_3$ used. The contents of the reaction were then heated to boiling (approximately 100° C.). A 5 ml sample of the dilute $AlCl_3$ solution was taken and analyzed for Al and Cl content. Aluminum pellets were then added to the boiling solution (83.7 g or 1.5 times the theoretical amount needed.) The reaction was allowed to proceed under boiling conditions until approximately an Al:Cl mole ratio of 2. During the course of the reaction, approximately 5-ml samples were withdrawn at set times using an 0.45 micron syringe filter and analyzed for Al content. The aluminum pellets were obtained from Columbia Specialty Metals in Hawesville, Ky. The pellets were flattened spheres with a size range of 0.20"-0.55". The purity of the aluminum pellets was 99.77% Al (p1020 grade). The 28% $AlCl_3$ solution was made from aluminum chloride hexahydrate ($AlCl_3 \cdot 6H_2O$) crystals (certified grade, >99% purity) purchased from Fisher Scientific. The metal salts were purchased from Aldrich Chemical.

Reaction rate results for the examples are presented as graphs of the Al:Cl mole ratio as a function of reaction time (in hours). Since the aluminum metal synthesis route is generally only used to produce basic aluminum chlorides with basicities of 50% or greater, only the graph covering the Al:Cl mole ratios of 0.7 to 2.0 was of interest. This would correspond to basic aluminum chlorides from $Al_2(OH)_3Cl_3$ to $Al_2(OH)_5Cl$. The reaction rate results for the metal salts investigated are presented in FIG. 1. As can be seen in FIG. 1, only cobalt and nickel function as a catalyst and accelerate the reaction of an aqueous solution of aluminum chloride with metallic aluminum. FIGS. 2 and 3 compare the effect of different concentrations of cobalt and nickel on the reaction rate.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of making basic aluminum halide, comprising reacting metallic aluminum with at least one aluminum halide or acid thereof in the presence of water and a catalytic amount of a catalyst, wherein said catalyst comprises a nickel cation or cobalt cation or both.

2. The method of claim 1, wherein said catalyst is a nickel cation.

3. The method of claim 1, wherein said catalyst is a cobalt cation.

4. The method of claim 1, wherein said catalytic amount of the nickel or cobalt cation is from 10 ppm to 1,000 ppm based on the weight of said aluminum halide in anhydrous form.

5. The method of claim 1, wherein said catalytic amount of the nickel or cobalt cation is from 25 ppm to 200 ppm based on the weight of said aluminum halide in anhydrous form.

6. The method of claim 1, wherein said basic aluminum halide has the formula $Al_2(OH)_nX_{6-n}$, wherein n is from 1 to 5, and X is fluorine, chlorine, bromine, or iodine.

7. The method of claim 1, further comprising adding an anion other than a halide.

8. The method of claim 7, wherein said anion is sulfate or silicate.

9. The method of claim 1, wherein said reacting occurs at a pH from 2.5 to 4.5 and at a temperature in the range of from 35° C. to 105° C.

10. The method of claim 1, wherein said catalyst is introduced in the form of a salt.

11. The method of claim 1, wherein the nickel cation is introduced in the form of a nickel compound selected from nickel acetate, nickel carbonate, nickel nitrate, nickel sulfate, nickel chloride, nickel oxide, or any combination thereof.

12. The method of claim 1, wherein the cobalt cation is introduced in the form of a cobalt compound selected from cobalt acetate, cobalt carbonate, cobalt nitrate, cobalt sulfate, cobalt chloride, cobalt oxide, or any combination thereof.

13. A method of making basic aluminum halide, comprising reacting metallic aluminum with at least one aluminum chloride or hydrochloric acid in the presence of water and a catalytic amount of a catalyst, wherein said catalyst comprises a nickel cation or cobalt cation or both.

14. The method of claim 13, wherein said catalyst is a nickel cation.

15. The method of claim 13, wherein said catalyst is a cobalt cation.

16. The method of claim 13, wherein said catalytic amount of the nickel or cobalt cation is from 10 ppm to 1,000 ppm based on the weight of said aluminum chloride in anhydrous form.

17. The method of claim 13, wherein said catalytic amount of the nickel or cobalt cation is from 25 ppm to 200 ppm based on the weight of said aluminum chloride in anhydrous form.

18. The method of claim 13, wherein said basic aluminum halide has the formula $Al_2(OH)_nCl_{6-n}$, wherein n is 1 to 5.

19. The method of claim 13, further comprising adding an aluminum compound other than an aluminum chloride.

20. The method of claim 13, wherein said reacting occurs at a pH from 2.5 to 4.5 and at a temperature in the range of from 35° C. to 105° C.

21. The method of claim 13, wherein said catalyst is introduced in the form of a salt.

22. The method of claim 13, wherein the nickel cation is introduced in the form of a nickel compound selected from nickel acetate, nickel carbonate, nickel nitrate, nickel sulfate, nickel chloride, nickel oxide, or any combination thereof.

23. The method of claim 13, wherein the cobalt cation is introduced in the form of a cobalt compound selected from cobalt acetate, cobalt carbonate, cobalt nitrate, cobalt sulfate, cobalt chloride, cobalt oxide, or any combination thereof.

* * * * *

UNITED STATES PATENT AND TRADEMARK OFFICE
CERTIFICATE OF CORRECTION

| | | |
|---|---|---|
| PATENT NO. | : 7,491,377 B2 | Page 1 of 1 |
| APPLICATION NO. | : 11/657850 | |
| DATED | : February 17, 2009 | |
| INVENTOR(S) | : Steelhammer et al. | |

It is certified that error appears in the above-identified patent and that said Letters Patent is hereby corrected as shown below:

IN THE CLAIMS:

Claim 17, Column 6, line 62, "25 ppm to 200 ppm" should read --20 ppm to 500 ppm--.

Signed and Sealed this

Twentieth Day of October, 2009

David J. Kappos
*Director of the United States Patent and Trademark Office*